Figure 1:
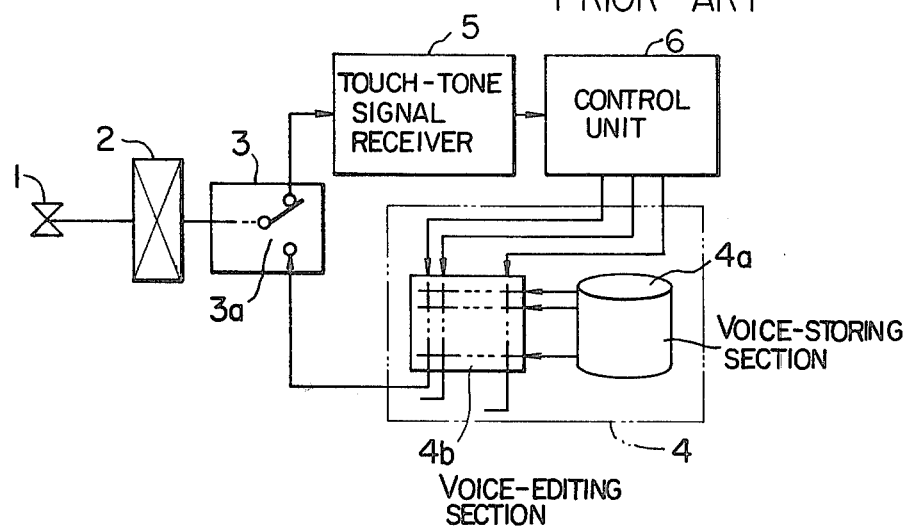

United States Patent [19]

Sakai

[11] 4,191,855
[45] Mar. 4, 1980

[54] FULL DUPLEX AUDIO RESPONSE DEVICE

[75] Inventor: Hisao Sakai, Yokohama, Japan

[73] Assignee: Hitachi, Ltd., Japan

[21] Appl. No.: 828,101

[22] Filed: Aug. 26, 1977

[30] Foreign Application Priority Data

Aug. 26, 1976 [JP] Japan ............................... 51-101883

[51] Int. Cl.² .......................................... H04M 11/00
[52] U.S. Cl. ................................. 179/2 A; 179/2 DP
[58] Field of Search .................. 179/2 R, 2 A, 2 DP, 179/84 VF; 340/151, 152 R; 178/58 R, 59, 60; 333/11

[56] References Cited

U.S. PATENT DOCUMENTS

| | | | |
|---|---|---|---|
| 3,103,558 | 9/1963 | Ligotky | 179/84 VF |
| 3,226,480 | 12/1965 | Wright | 179/2 DP |
| 3,347,988 | 10/1967 | Marill | 179/2 DP |
| 3,647,972 | 3/1972 | Glover | 179/2 DP |
| 3,992,587 | 11/1976 | Puckett | 179/2 A |

Primary Examiner—Bernard Konick
Assistant Examiner—Joseph A. Popek
Attorney, Agent, or Firm—Craig and Antonelli

[57] ABSTRACT

In an audio response device comprising an incoming trunk, a push button signal receiver, a voice output unit and a control unit and associated with a terminal set such as a push button calling telephone set, there is provided a full duplex audio response device which includes a hybrid circuit disposed in the incoming trunk associated with the terminal set and a band-pass filter interposed between the voice output unit and the hybrid circuit for filtering a frequency component corresponding to a specified push button, and in which the hybrid circuit may receive a voice output signal passed through the band-pass filter and a push button signal from the terminal set simultaneously so that the push button signal can be received even when the voice output signal is transmitted to the terminal set.

4 Claims, 2 Drawing Figures

FULL DUPLEX AUDIO RESPONSE DEVICE

LIST OF PRIOR ART REFERENCE

The following reference is cited to show the state of the art:

Technical Report of Second USA-JAPAN Computer Conference, 1975, entitled "Automatic Seat Reservation by TOUCH-TONE Telephone", written by S. Sagawa, K. Kohri, and K. Takahashi of Japanese National Railways, and E. Shikiba of Nippon Telegraph and Telephone Public Corp., and A. Suehiro of Hitachi Ltd., pp 290-294.

The present invention relates to an audio response device associated with a terminal set such as a push button-calling telephone set such as that produced under the Trademark TOUCH-TONE (hereinafter referred to as a TOUCH-TONE telephone set) or the like.

With recent progress of information-oriented society, there arises an ardent trend of increase in service utilizing telephone lines. As an example of this trend, it is now possible to carry out information guidance for various types of intelligence by utilizing as data input a TOUCH-TONE signal from the TOUCH-TONE telephone set used in common telephone communications.

In a data communication system associated with a terminal set such as a TOUCH-TONE telephone set, it is necessary to perform the information transmission from a central processor such as a computer to the terminal set by the aid of a voice signal.

Thus, an audio response device is adapted to convert digital information treated by the central processor into speech information and deliver out a voice signal.

Generally, in the audio response device associated with the terminal set of the TOUCH-TONE telephone set, the TOUCH-TONE signal originated from the TOUCH-TONE telephone set is allocated to the audio-frequency band. For this reason, if the TOUCH-TONE signal from the telephone set is received during the transmission of a voice output signal to the TOUCH-TONE telephone set, the TOUCH-TONE signal will be received along with the voice output signal with the delivery of an erroneous data input, resulting in an erroneous operation. As a countermeasure for this, that is, for preventing the reception of the TOUCH-TONE signal during the transmission of the voice output signal, a half duplex audio response device has conventionally been available.

FIG. 1 is a block diagram of one example of a prior art half duplex audio response device. In the prior art communication system as shown in FIG. 1, the half duplex audio response device comprising an incoming trunk 3 with a transfer switch 3a, a voice output unit 4 with a voice-storing section 4a and a voice-editing section 4b, a TOUCH-TONE signal receiver 5 and a control unit 6 is associated with a TOUCH-TONE-calling telephone set 1 through a public telephone exchange 2.

With this device, when receiving a TOUCH-TONE signal from the TOUCH-TONE-calling telephone set 1, on the one hand, the transfer switch 3a of incoming trunk 3 is thrown to the TOUCH-TONE signal receiver 5 to disconnect the telephone set 1 from the voice output unit 4. Thereafter, the TOUCH-TONE signal is received into the control unit 6 through the TOUCH-TONE signal receiver 5. When transmitting a voice output signal, on the other hand, the transfer switch 3a is thrown to the voice output unit 4 to disconnect the telephone set 1 from the TOUCH-TONE signal receiver 5 and then the voice output signal is transmitted to the TOUCH-TONE telephone set 1.

As having been explained, the prior art half duplex audio response device fails to receive the TOUCH-TONE signal simultaneously during the transmission of voice output signal with the result that even when the content of the voice output signal from the audio response device is interpreted in the course of communication, the delivery of data input from the TOUCH-TONE telephone set is prevented until the transmission of voice output signal has been completed. This defect prolongs the time for completing the delivery of all the data inputs. As a result, the audio response device is occupied by a specified TOUCH-TONE telephone set (or a terminal set) for a long time, preventing an efficient application of the device.

An object of the present invention is to provide an audio response device capable of receiving the TOUCH-TONE signal even when the voice output signal is transmitted to the TOUCH-TONE telephone set, thereby performing the data input within a short time.

The invention contemplates an improvement in an audio response device of the type comprising TOUCH-TONE signal receiver, voice output means and control means and associated with a terminal set such as a TOUCH-TONE-calling telephone set of the like. There is provided a full duplex audio response device which is featured by the provision of a hybrid circuit and a band-pass filter, and in which a voice output signal supplied from the voice output means through the band-pass filter and a TOUCH-TONE signal from the terminal set are delivered to the hybrid circuit simultaneously, so that the TOUCH-TONE signal can be received during the transmission of the voice output signal and frequency components of the voice output signal common to those of the TOUCH-TONE signal can be filtered by the band-pass filter.

According to the invention, there is provided a full duplex audio response device for use with a terminal set such as a TOUCH-TONE-calling telephone set or the like, which comprises TOUCH-TONE signal receiver, voice output means, control means responsive to an output signal of the TOUCH-TONE signal receiver and controlling the voice output means, a hybrid circuit, and a band-pass filter. The voice output means stops a voice output signal in response to an output signal of the control means, and the hybrid circuit receives the voice output signal through the band-pass filter and also a TOUCH-TONE signal from the terminal set, simultaneously, whereby the TOUCH-TONE signal may be received during the transmission of the voice output signal to the terminal set, and frequency components of the voice output signal common to those of the TOUCH-TONE signal may be filtered by the band-pass filter.

Figure 2:
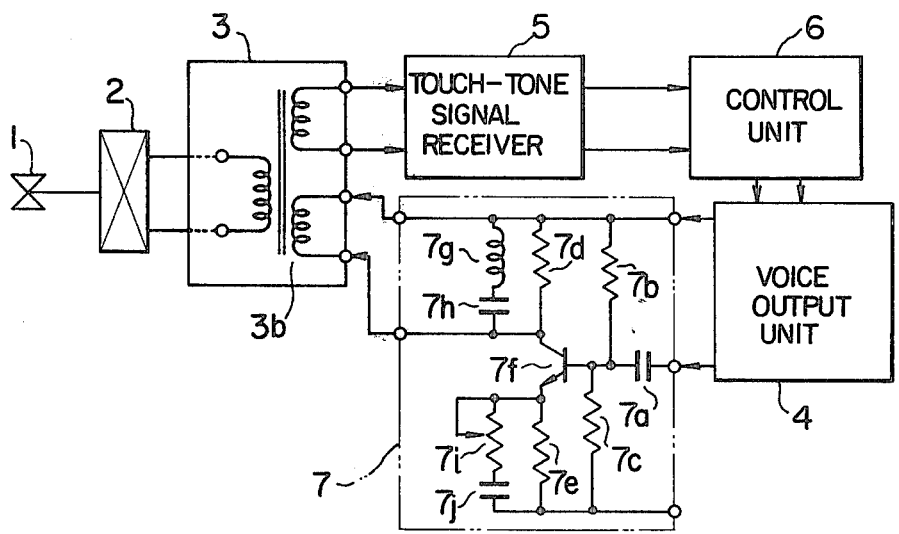

FIG. 1 is a block diagram of one example of a prior art audio response device, and FIG. 2 is a block diagram of one embodiment of an audio response device according to the invention.

As diagrammatically shown in FIG. 2, an audio response device embodying the invention comprises, like the prior art device of FIG. 1, an incoming trunk 3, a voice output unit 4, a TOUCH-TONE signal receiver 5 and a control unit 6 and it is associated with a TOUCH-TONE-calling telephone set 1 through a public telephone exchange 2. Differing from the prior art device, the audio response device of the invention further comprises a hybrid circuit 3b provided for the incoming trunk in place of the transfer switch 3a of FIG. 1 and a band-pass filter 7 interposed between the voice output unit 4 and the hybrid circuit 3b. The band-pass filter 7 includes a coupling capacitor 7a, bias resistors 7b to 7e, a transistor 7f, a tuning coil 7g, a tuning capacitor 7h, a gain adjusting resistor 7i and a by-pass capacitor 7j, these elements being interconnected as shown in FIG. 2.

A tuning frequency (determinable by the tuning coil 7g and capacitor 7h) is predeterminedly tuned to a specified frequency associated with a button "*" of those push buttons of the TOUCH-TONE telephone set 1.

With the audio response device of this construction, a voice output signal from the voice output unit 4 having been passed through the band-pass filter 7 and a TOUCH-TONE signal from the TOUCH-TONE telephone set 1 are delivered to the TOUCH-TONE signal receiver 5 simultaneously so that the TOUCH-TONE signal may be received even when the voice output signal is transmitted to the terminal set. In consideration of the fact that frequency components of both the voice output signal and TOUCH-TONE signal occupy the same frequency band and the voice output signal should be taken for the TOUCH-TONE signal erroneously, the band-pass filter 7 is provided for eliminating frequency components of the voice output common to those of the TOUCH-TONE signal. However, if frequency components associated with all the push buttons (0~9, *, #, etc.) were eliminated, the voice output signal to be transmitted to the TOUCH-TONE telephone set 1 could be distorted to a great extent, impairing audibility. Therefore, as described above, the band-pass filter 7 is designed to eliminate only a frequency component associated with the button "*", for example. Thus, when it is desired to deliver a data input to the audio response device from the TOUCH-TONE telephone set 1 during the transmission of a voice output signal to the TOUCH-TONE telephone set 1 from the voice output unit 4, an input of the button "*" is first delivered from the TOUCH-TONE telephone set 1. The TOUCH-TONE signal associated with the button "*" is passed through the hybrid circuit 3b and then received by the TOUCH-TONE signal receiver 5. When detecting the button "*" input, the control unit 6 causes the voice output unit 4 to stop transmitting the voice output signal, thereby facilitating the reception of the subsequent data input from the TOUCH-TONE telephone set 1.

In this manner, according to the full duplex audio response device of this invention, the TOUCH-TONE signal can be received automatically even when the voice output signal is transmitted to the telephone set so that the time required for inputting data into the audio response device associated with the terminal set such as the TOUCH-TONE telephone set can be reduced greatly. Moreover, since only the same frequency component of voice output signal as that associated with a specified button is eliminated, the distortion of the voice output signal can be minimized.

Although having been described in the foregoing embodiment by way of the device associated with the terminal set such as the TOUCH-TONE telephone set, the invention is applicable to the device associated with the TOUCH-TONE telephone set having a push-button dial section and a special key section and in such a case, the transmission of the voice output signal can be stopped by a frequency other than frequencies allocated to the push-button dial section.

What is claimed is:

1. A full duplex audio response device for use with a terminal set such as a push button calling telephone set for generating push button signals and receiving voice signals, comprising:

push button signal receiving means;

voice output means for generating a voice output signal;

a hybrid circuit coupled between said push button signal receiving means and said terminal set, wherein said push button signal receiving means receives push button from said terminal set through said hybrid circuit;

a band-pass filter coupled between said voice output means and said hybrid circuit for filtering out frequency components of the voice output signal which lie within the bandwidth of a particular push button signal, wherein said voice output signal is passed to said terminal set through said band-pass filter and said hybrid circuit;

control means coupled between said push button signal receiving means and said voice output means to control said voice output means in accordance with push button signals received by said push button receiving means and to terminate transmission of said voice output signal upon said voice output means only upon the reception of said particular push button signal;

wherein when said hybrid circuit simultaneously receives said voice output signal through said band-pass filter and said particular push button signal from said terminal set, said particular push button signal will activate the control means to terminate transmission of the voice output signal without interference between the voice output signal and the particular push button signal.

2. The device according to claim 1, wherein said hybrid circuit comprises a hybrid transformer.

3. The device according to claim 1, wherein said band-pass filter eliminates any one of the frequency components within a frequency band allocated to a public telephone exchange.

4. The device according to claim 1, wherein said band-pass filter eliminates the same frequency component as that of any one of a plurality of push button signals associated with the terminal set.

* * * * *